United States Patent

[11] 3,607,385

| [72] | Inventors | Takeshi Namikata<br>Kawasaki-shi;<br>Kentaro Hirata, Suzaka-shi; Yuji Ichikawa,<br>Suzaka-shi, all of Japan |
|---|---|---|
| [21] | Appl. No. | 769,121 |
| [22] | Filed | Oct. 21, 1968 |
| [45] | Patented | Sept. 21, 1971 |
| [73] | Assignee | Fujitsu Limited<br>Kawasaki, Japan |
| [32] | Priority | Feb. 13, 1968 |
| [33] | | Japan |
| [31] | | 43/9057 |

[54] METHOD OF MANUFACTURING SOLID CAPACITORS
3 Claims, 2 Drawing Figs.

[52] U.S. Cl. .................................................. 117/215,
117/62, 117/201, 29/25.42
[51] Int. Cl. ........................................................ B44d 1/18
[50] Field of Search ......................................... 29/25.42,
25.41; 117/215, 62, 201; 204/38 A

[56] References Cited
UNITED STATES PATENTS

| 3,036,249 | 5/1962 | Hall .............................. | 29/25.41 |
| 3,093,883 | 6/1963 | Haring et al. ................... | 29/25.42 |
| 3,277,553 | 10/1966 | Wesdlowski .................... | 29/25.41 |
| 3,279,030 | 10/1966 | Wagner et al. ................. | 29/25.42 |
| 3,386,856 | 6/1968 | Noorlander .................... | 29/25.42 |

FOREIGN PATENTS

| 1,367,895 | 6/1964 | France .......................... | 29/25.42 |

*Primary Examiner*—Alfred L. Leavitt
*Assistant Examiner*—C. K. Weiffenbach
*Attorneys*—Curt M. Avery, Arthur E. Wilfond, Herbert L. Lerner and Daniel J. Tick

ABSTRACT: Described is a method of manufacturing a solid capacitor wherein a capacitor is constituted by forming a film or forming metal and attaching manganese dioxide. The method is characterized in that a solution of manganese nitrate in water impregnated in the element is first pyrolyzed under a high temperature and at the moment when generation of $NO_2$ gas is nearly finished, the ambient temperature is kept lower than said temperature.

METHOD OF MANUFACTURING SOLID CAPACITORS

SPECIFICATION

Our invention relates to a method of manufacturing solid capacitors and more particularly to a method of manufacturing large-capacity solid capacitors with a small leakage current.

In a solid electrolytic capacitor wherein a film formed on the surface of a film forming metal by anodically oxidizing the film forming metal such as tantalum, aluminum or titanium is used as the dielectric, the cathode is ordinarily formed by providing a manganese dioxide layer on the dielectric. In general, this manganese dioxide layer can be obtained by pyrolyzing an aqueous solution of manganese nitrate at 350°–450° C. However, during the pyrolysis treatment of manganese nitrate, the anodically oxidized film is damaged, severely effecting the electrical characteristic of the completed capacitor. It has been ascertained that the longer the time required for the pyrolysis treatment, the more the oxidized film deteriorated. The capacity of the conventional solid electrolytic capacitors is relatively small, therefor, the size of the capacitor element is also not very large, so that in many cases the pyrolysis of manganese nitrate can be completed in 1 to 3 minutes. Recently, however, solid capacitors of large capacity have become desirable and accordingly it has become necessary to use very large capacitor elements. For example, in the conventional aluminum solid electrolytic capacitor using a plate-shaped element, the maximum CV (capacitance voltage) product is 60 to 120 $\mu$F.V. (microfarad volts) but recently large capacity capacitors of sinter type with a maximum CV product of 750 $\mu$F.V. and very large capacity capacitors of wound-foil type with a maximum CV product of above 3,500 $\mu$F.V. have been developed. A large-sized capacitor element as described above requires incomparably more manganese dioxide than the conventional plate-shaped element and the period of time required for the pyrolysis treatment becomes very long. For the reasons described above, the characteristics of the capacitor become very bad if the period of time required for the pyrolysis treatment exceeds 10 to 15 minutes.

Therefore, it is an object of our invention to provide a method of manufacturing solid capacitors by which the period of time required for the pyrolysis treatment can be shortened. This invention particularly provides a method of manufacturing solid capacitors of a small leakage current. These objects can be achieved in accordance with this invention by manufacturing a solid capacitor wherein the capacitor is constituted by forming a film on forming metal and attaching manganese dioxide. The manufacturing method is further characterized in that an aqueous solution of manganese nitrate impregnated in the element is first pyrolyzed under a high temperature and at the moment when generation of $NO_2$ gas is nearly finished, the ambient temperature is kept lower than said temperature and is still further characterized in that the manganese nitrate pyrolysis treatment is performed under pressure reduction.

On the drawings, which will be used to explain the invention,

Figure 1:
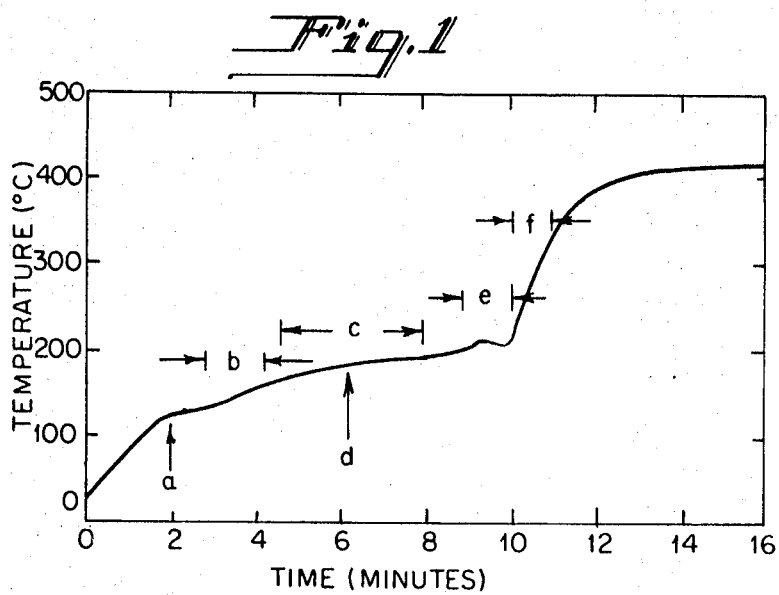
FIG. 1 shows a pyrolysis curve available when only a solution of manganese nitrate is pyrolyzed.

The invention will be described in greater detail. This invention was made based on a completely novel concept relating to pyrolysis of manganese nitrate. Apart from the suggestion of the prior art, we propose to utilize high-temperature atmosphere which has not been applied to pyrolysis treatment. We shorten the period of time required for pyrolysis treatment by heating manganese nitrate in an atmosphere of relatively high temperature. In this invention, an aqueous solution of manganese nitrate is impregnated in an anodically oxidized capacitor element. Manganese dioxide is precipitated in a short period of time by heating the impregnated element in an atmosphere of a relatively high temperature. This heating in an atmosphere of a relatively high temperature is stopped before the temperature of the element is raised sharply in the heating.

By this technique, precipitation of manganese dioxide can be performed effectively in a short period of time. Before the temperature of the element is raised sharply in the heating, the temperature of the atmosphere is lowered to a temperature which will not deteriorate the formed film and will achieve complete pyrolysis. By heating in an atmosphere of a relatively high temperature under reduced pressure, the period of time required for pyrolysis can be reduced effectively. What is important in this invention is the conception of heating under high temperature based upon a recognition that the temperature of the element in the pyrolysis treatment is kept at a nearly constant and relatively low temperature for a long period of time and is thereafter raised sharply to the temperature of the external atmosphere. By this heating concept, it is made possible to prevent damage and deterioration of the element, i.e., formed film and effectively shorten the period of time required for pyrolysis which had been impossible in the conventional method. Precipitation of manganese dioxide by pyrolysis of manganese nitrate can be completed in a given element and solution through a number of different processes.

These methods are characterized by impregnating a solution of manganese nitrate into a wound element, heating of the element in an atmosphere of a relatively high temperature which has hitherto been used and conversion into the accompanying atmosphere of low temperature before sharply raising the temperature of the element. In any case, pyrolysis of manganese nitrate is performed under a relatively high temperature, whereby the period of time required for the heat treatment can be shortened. As the result, manganese dioxide is coated on the formed film. Accordingly, the period of time required for the heat treatment can be shortened and therefore preventing an increase of leakage current by deterioration of the formed film. This means that it is possible to manufacture capacitors of large capacity which maintain the value of their leakage current small.

While the fundamental concept of this invention has been described above, this invention will be now described in even greater detail with reference to the drawings. As is well known, pyrolysis characteristic has heretofore been chiefly judged by measuring the curve showing the relation between reduction of weight and heating temperature in the pyrolysis of manganese nitrate. But, if the deterioration of the formed film accompanying increase of the period of time required for treatment and particularly increase of the leakage current is taken into consideration, the relationship between the temperature of the manganese nitrate and the heating interval is more important.

FIG. 1 shows a pyrolysis curve available when 10 cc. of an aqueous solution of manganese nitrate in water $Mn(NO_3)_2 \cdot 6H_2O$ is inserted into an electric furnace held at a constant temperature of 420° C. and pyrolysis is performed. It can be seen from this figure that the temperature of the solution is raised by several steps. In FIG. 1, at the movement shown by a generation of steam and boiling is started. Generation of $NO_2$ gas is started during the period of $b$, $NO_2$ gas is generated most actively during the period of $c$, generation of steam is nearly stopped at moment $d$, only little $NO_2$ gas is generated during the period of $e$ and no $NO_2$ gas can be seen by the naked eye during the period of $f$ and decomposition is nearly completed at about 270° C. As evident from this figure, the temperature in the pyrolysis of manganese nitrate is kept under 200° C. during most of the time in which pyrolysis is performed even if the ambient temperature is high. This invention is fundamentally based on this recognition. Therefore, in this invention, the element is first exposed in an atmosphere of an ambient temperature higher than the temperature of 359° to 450° C. in the conventional method and immediately before the pyrolysis is nearly finished, the temperature of the element is raised sharply, the ambient temperature is lowered to 350° to 450° C., whereby the period of time required for the pyrolysis can be reduced and moreover manganese dioxide can be precipitated without the possibility of formation of a lower oxide.

Figure 2:
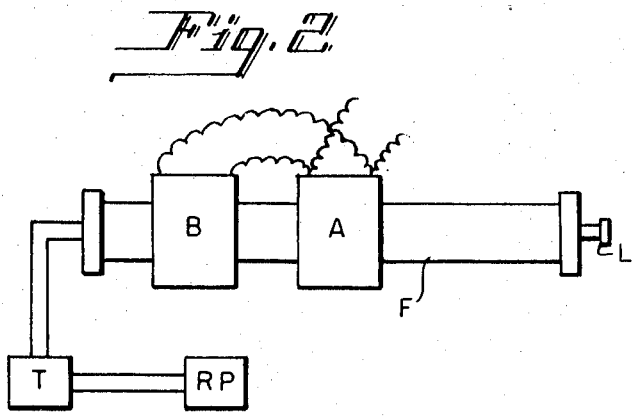
FIG. 2 shows an example of the device for carrying out the invention.

FIG. 2 shows an example of the device for effecting the aforementioned heat treatment. A and B designate heaters that are horizontally movable on a tubular furnace F. The element is inserted into this tubular furnace F and is first situated in an area in which heater A is kept at a relatively high temperature, for example, 600° C. Here, the element is heated rapidly and pyrolysis proceeds and immediately before the temperature of the sample sharply increases, heater B set at 350° C. is moved to the position at which the sample is situated and displaces heater A, whereby the temperature of the sample can be kept under 400° C. over all the period of pyrolysis treatment.

Figure 3:
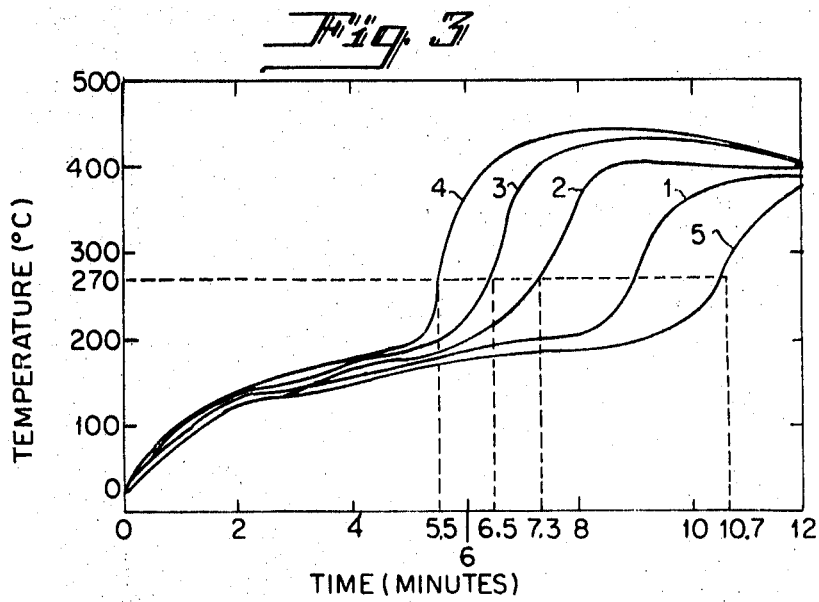
FIG. 3 shows pyrolysis temperature curves available when the ambient temperature of the capacitor element is varied according to the invention.

FIG. 3 shows pyrolysis curves 1, 2, 3 and 4 available in pyrolysis treatment of manganese nitrate in the manufacture of a wound-foil type aluminum solid capacitor wherein the dimension of the element is 16.5 mm. diameter × 25 mm. length, by use of a device as shown in FIG. 2. Curves 1, 2, 3 and 4 show characteristics exhibited when the temperature of heater A is respectively at 450° C., 500° C., 550° C. and 600° C. Heater B was always set at a temperature of 400° C. Curve 5 shows the characteristic available when pyrolysis was performed at a constant temperature of 380° C. according to the conventional method. As evident from this drawing, by raising the temperature in the initial period of pyrolysis, the period of time required until the temperature 270° C. at which pyrolysis is nearly finished can be shortened from 10.7 minutes to 5.5 minutes. By definition herein, the relatively high temperature used in the explanation of this invention is a temperature of above 450° C. This is because it has heretofore been considered that about 450° is the highest value to which the temperature can be raised without deteriorating the formed film.

As described above, according to the method of this invention, the period of time required for the treatment can be reduced to about half of that required in the conventional method with a concomitant reduction of leakage current. To supplement the above explanation, the pyrolysis is nearly completed when 270° C. is reached, but in any case further heat treatment for 5 to 10 minutes at 400° C. is required in order to complete pyrolysis.

Figure 4:
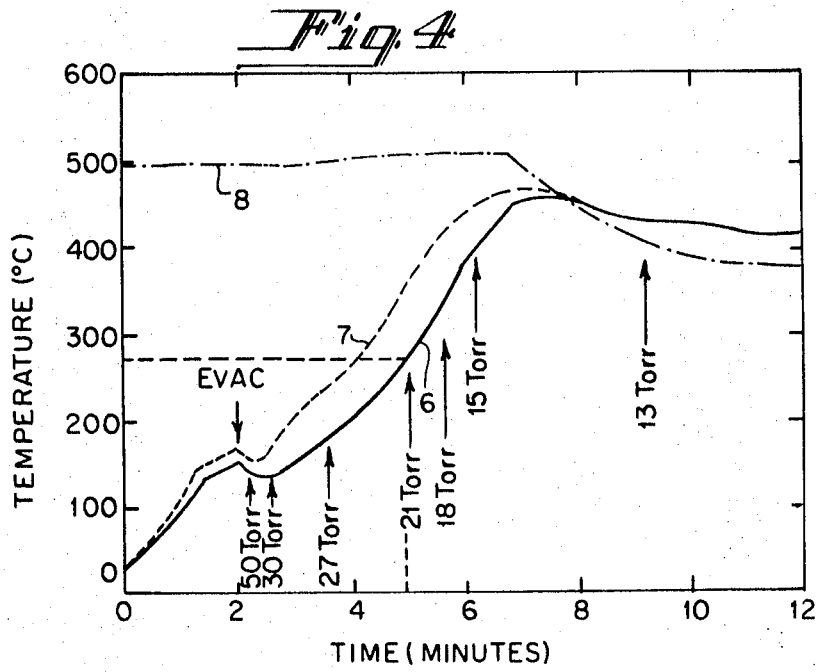
FIG. 4 shows pyrolysis temperature curves available when pyrolysis is performed under pressure reduction.

Furthermore, according to the fundamental theory of this invention, $NO_2$ gas and steam generated during pyrolysis absorb heat and are harmful and therefore must be removed as soon as possible to expedite pyrolysis reaction. This results in aforementioned heat treatment being under reduced pressure. As viewed from the above viewpoint, the conventional concept that pyrolysis must be performed under a pressure higher than atmospheric or normal, is meaningless. An example of the device for carrying the method of this invention as described above into effect under pressure reduction is as shown in FIG. 2, and furnace F of hermetic structure is provided with an evacuator (a rotary pump) RP and a trap T for removing $NO_2$ gas and steam. L designates a leak valve. FIG. 4 shows examples of the pyrolysis temperature curve available when manganese nitrate is impregnated in a wound-foil type element of the dimension of 17 mm. diameter by 30 mm. length and pyrolysis treatment is performed by the use of the device shown in FIG. 2. The term "Evac" is the point at which evacuation is started, while the numerals under the curves show the degree of vacuum in the furnace tube. Curve 6 shows the temperature within the capacitor element, curve 7 shows the temperature of the external surface of the capacitor element and curve 8 shows the temperature of the atmosphere surrounding the element. Exchange of the heater at the high temperature of 500° C. to the heater at the low temperature of 400° C. is performed after about 6 minutes and 30 seconds have elapsed. As evident from the drawing, when evacuation is started, the temperature of the manganese nitrate, i.e., capacitor element is lowered rapidly. When the same kind of sample is used, this lowering of temperature is determined by the relationship between the amount of heat supplied to the pyrolyzing furnace and the amount of evacuation of the evacuator. It is desirable to supply sufficient heat so that the temperature may not be lowered too much. Although the dimension of the element of the sample in the present example is larger than that in the example shown in FIG. 3, the period of time required until 270° C. is reached, has been reduced from 7 minutes to 5 minutes.

It is therefore evident that if heating and evacuation can be performed at a higher temperature, the period of time required for treatment can be markedly reduced. If the pressure reduction is started too early, no effect can be obtained and it is desirable that the pressure reduction be started during the period of $b$ in which generation of $NO_2$ gas is started as seen in FIG. 1.

A specific embodiment of this invention will be using concrete numerical values. Manganese nitrate was impregnated in a sample using an element of a dimension of 16.5 mm. diameter by 25 mm. length. This sample was placed on a device shown in FIG. 2. The device was started to be heated at the ambient temperature of 500° C. while the pressure reduction was started after 2 minutes have elapsed at which point the temperature of the element reached 170° C. After heating for 6 minutes, the ambient temperature was lowered to 400° C. and was held for 5 to 10 minutes during which pyrolysis was performed. In comparison thereto a similar sample to that described was heated at the constant temperature of 380° to 390° C. for 16 to 21 minutes (11 minutes were required to arrive at 270° C.) and pyrolysis was performed. Thus 10 wound-foil-type aluminum solid electrolytic capacitors each of a rated voltage of 25 v. were manufactured and the characteristics of these capacitors were compared. The average electrostatic capacity of the capacitors according to this invention was 122 $\mu F$, the average loss was 7.6 percent and the average leakage current was 51 $\mu A$, whereas the average capacity of the capacitors manufactured by the conventional method was 102 $\mu F$, the average loss was 4.5 percent and the average leakage current was 490 $\mu A$.

While this invention has been described with reference to a preferred embodiment thereof, it is needless to say that various modifications may be made therein based on the concept thereof.

What is claimed is:

1. In the method of manufacturing a solid capacitor by forming an anodically oxidized film on a film forming metal and attaching manganese dioxide, the improvement which comprises the steps of (1) impregnating an element having an anodically oxidized film formed thereon with an aqueous solution of manganese nitrate; (2) placing said impregnated element into a furnace; (3) pyrolyzing the impregnated element in an atmosphere at a high temperature between 450° and 600° C.; (4) reducing the pressure in said furnace below atmospheric pressure when $NO_2$ begins to evolve; and (5) lowering the temperature of said atmosphere to a lower temperature between 350° and 400° C. when the temperature of said element approaches 270° C. and the evolution of $NO_2$ nearly complete.

2. The method of claim 1, wherein the high temperature is above 450° C. and the lower temperature is about 400° C.

3. The method of claim 1, wherein the high temperature is 500° C.